March 21, 1961 J. L. HILL ET AL 2,975,894
MAGNETIC CORE HANDLING DEVICE
Filed Feb. 11, 1959 4 Sheets-Sheet 1

INVENTORS
JOHN L. HILL
ROBERT R. REISINGER
BY
Stuart R. Peterson
ATTORNEY

March 21, 1961 J. L. HILL ET AL 2,975,894

MAGNETIC CORE HANDLING DEVICE

Filed Feb. 11, 1959 4 Sheets-Sheet 2

INVENTORS
JOHN L. HILL
ROBERT R. REISINGER
BY
Stuart R. Peterson
ATTORNEY

March 21, 1961 J. L. HILL ET AL 2,975,894

MAGNETIC CORE HANDLING DEVICE

Filed Feb. 11, 1959 4 Sheets-Sheet 3

INVENTORS
JOHN L. HILL
ROBERT R. REISINGER
BY
Stuart R. Peterson
ATTORNEY

March 21, 1961 J. L. HILL ET AL 2,975,894

MAGNETIC CORE HANDLING DEVICE

Filed Feb. 11, 1959 4 Sheets-Sheet 4

INVENTORS
JOHN L. HILL
ROBERT R. REISINGER
BY
Stuart R. Peterson
ATTORNEY

United States Patent Office 2,975,894

Patented Mar. 21, 1961

2,975,894

MAGNETIC CORE HANDLING DEVICE

John L. Hill, North St. Paul, and Robert R. Reisinger, Mahtomedi, Minn., assignors to Telemeter Magnetics, Inc., Los Angeles, Calif., a corporation of New York Filed Feb. 11, 1959, Ser. No. 792,649

14 Claims. (Cl. 209—72)

This invention relates generally to apparatus for automatically handling toroidal magnetic cores, and pertains more particularly to a device for successively positioning a plurality of such cores, whereby the cores can be effectively tested in a rapid manner.

A description of the toroidal magnetic cores of the type for which the present invention is employed may be found in an article in the October 1953 issue of the Proceedings of the IRE, page 1407. The article is entitled A Myriabit Magnetic-Core Matrix Memory by Jan A. Rajchman. This article is mentioned in Patent No. 2,817,809 issued to Raymond Stuart-Williams on December 24, 1957, and reference may be had to this patent for a succinct account of what is typically desired in the way of actual core tests.

One object of the present invention is to uniformly present a series of toroidal magnetic cores in a successive fashion to a given location or station, whereby they are releasably held pending their removal by a test probe. More specifically, it is an aim of the invention to deliver gravitationally the cores, preferably assisted by suitable vibration, to said station and thereafter retain by vacuum the foremost core in a properly oriented manner until removed or dislodged by a prescribed travel of the test probe after its insertion into the opening of the vacuum-held core. Fortuitously, should any core fragments be delivered to the station they will be quickly withdrawn via the vacuum passage, the next core above then immediately dropping into place at said station. Also, should any core so held not have an opening, it will be pushed aside by the rectilinear advancement of the probe.

Owing to the rapidity with which magnetic core testing takes place, or at least to the speed with which it is desired that the testing cycle occur, the less rubbing between the wire test contacts and the probe the better. Therefore, another object of the invention is to minimize the rubbing between the contacts and probe. In this regard, it is intended that substantially no engagement of the wire contacts be made during the reciprocal travel of the probe, and that the contacts follow the probe while it is being moved laterally, the actual testing of the core being achieved during such lateral travel.

A further object is to provide a simple means for removing each core from the probe after the testing has been accomplished. More particularly, it is planned that a stripper plate be disposed in such a way that the retraction of the probe over the return portion of its reciprocal path will brush or wipe off the core from the probe. By this time the testing results will have been automatically performed and analyzed, and the core as it gravitationally falls from the probe can be deflected into the proper receptacle depending upon the results of the test.

Still another object is to provide a core handler that is of simple, rugged construction and which can be depended upon to classify correctly magnetic cores that have been placed therein without any separate initial screening, such screening taking place within the handler itself.

Yet another feature of the invention is to provide a core handling device that is exceedingly compact, and which is completely portable so that it can be moved about and placed at the most advantageous location.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figures 1, 2, 3:
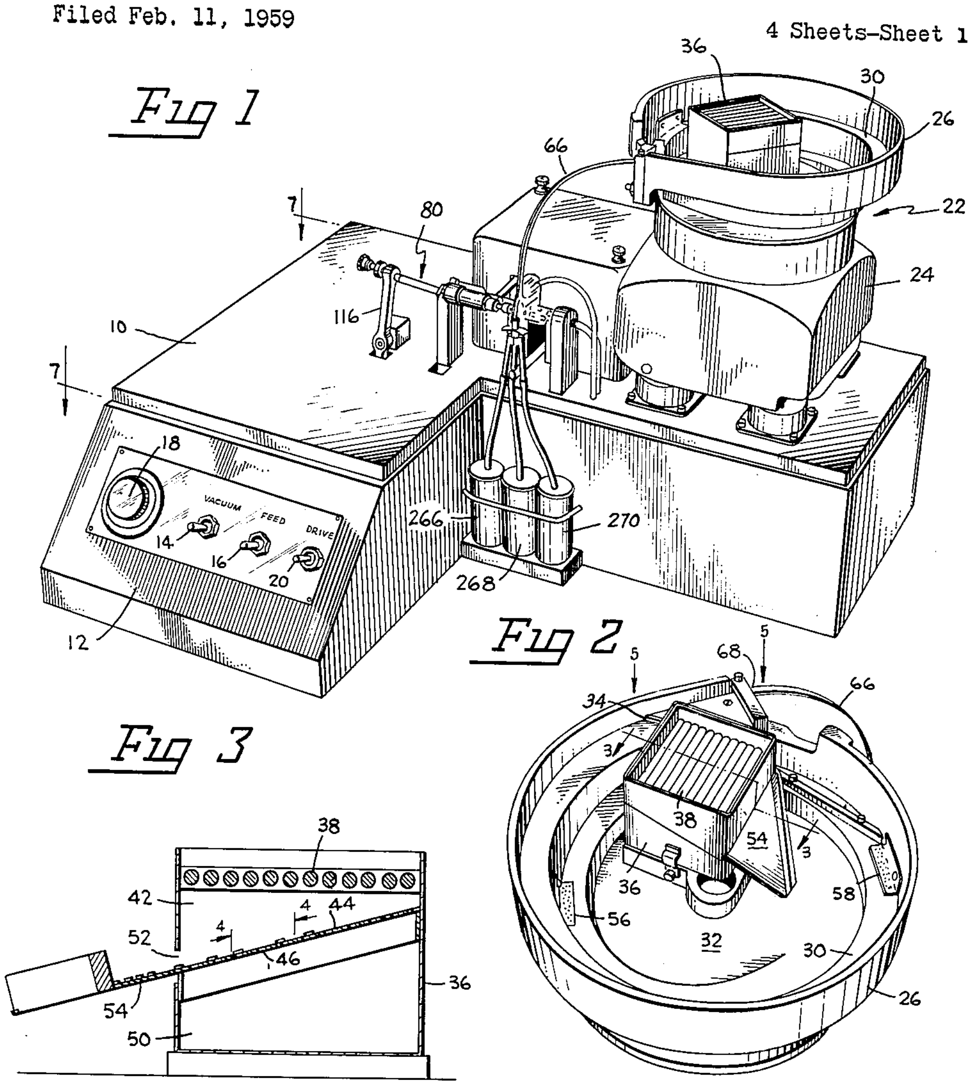
Figure 1 is a perspective view of the overall core handling device exemplifying the invention.
Figure 2 is a perspective view of the spiral conveyor, together with the grizzly box by which an initial screening of the cores is achieved.
Figure 3 is an elevational sectional view taken through the grizzly box in the direction of line 3—3 of Figure 2.

Referring first to Figure 1 of the drawings, the core handling device there illustrated comprises a generally L-shaped housing 10 having a control panel 12 at its forward end. Although the specific functions performed by the control panel 12 will be better understood as the description progresses, it may be explained at this time that the panel includes a vacuum switch 14, a feed switch 16, a knob 18 by which the rate of feed of the individual magnetic cores may be adjusted, and a drive switch 20.

Disposed on the top of the housing 10 is a vibratory conveyor mechanism designated generally by the reference numeral 22. Although this mechanism 22 is fully described in Patent 2,696,292 issued to William V. Spurlin on December 7, 1954, it may be pointed out that it includes a casing 24 in which is housed an electromagnetic motor for producing desired vibrations, such motor being in circuit with the feed switch 16 and having its speed controlled by the knob 18. Surmounting the casing 24 is a feed bowl 26 having a spiral track or raceway 30 extending upwardly from the floor 32 of the bowl to an elevated discharge point 34.

Figure 4:
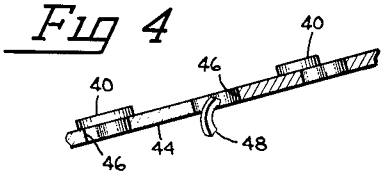
Figure 4 is a greatly enlarged fragmentary detail view of a section of the perforated screen in the region between the arrows 4—4 of Figure 3 through which broken cores or chips will exit.

A preliminary screening of the magnetic cores to be tested is effected by a box 36 fixedly attached to the floor 32. This box contains a grizzly 38 located in the top thereof upon which the cores are initially placed. The number of cores placed in this box at one time is typically 10,000. Some of the cores are shown to better advantage in Figures 4 and 5, being denoted by the reference numeral 40. As will be readily perceived these cores are toroidal in form with rectangular cross sections.

Those cores 40 thin enough to pass between the bars of the grizzly 38 fall into a compartment 42 formed by an inclined platform or partition 44. The lower half of this platform contains a plurality of apertures 46 shown to good advantage in the enlarged sectional detail view appearing in Figure 4, thereby providing a screen. These apertures in this screen allow broken cores and chips, such as the broken core 48, to fall therethrough into a bottom compartment 50 from where they can be withdrawn from time to time and discarded. However, the apertures are purposely made too small to permit the unbroken cores 40 to escape therethrough, the inclination of the platform or screen directing them out through an opening 52 in one side of the box onto an apron 54. From the apron 54 the cores fall onto the floor 32.

Owing to the design of the vibratory conveyor mechanism 22, the cores 40 upon reaching the floor 32 are continually vibrated in an angular direction up the spiral track 30 and in the course of such travel pass over two screens 56, 58 which supplement the action of the perforated platform or screen 44 of the compartment 42, any broken cores or chips not previously removed exiting via these supplemental screens.

Figure 5:
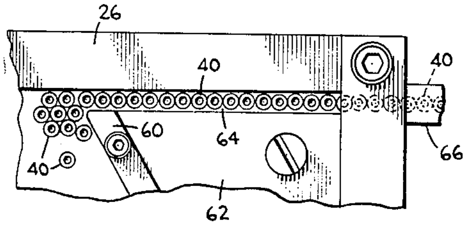
Figure 5 is an enlarged fragmentary plan view in the region between the arrows 5—5 of Figure 2, the view showing a series of toroidal magnetic cores in the process of entering the upper end of the feed chute.

Upon reaching the upper end 34 of the track or raceway 30, the cores 40 are compelled to follow a single file course by a guide element 60 and a wall or plate member 62 forming a channel 64 with the side wall of the bowl 26, as best viewed in Figure 5.

The channel 64 leads directly to the entrance of a feed chute 66 having a rectangular cross section so dimensioned as to accommodate the various cores 40. While the major axis of the feed chute 66 extends in a horizontal direction at its upper or entrance end 68, there is a gradual twist imparted to the chute 66 intermediate its ends so that by the time the cores 40 reach the lower or discharge end 70 thereof they will have been turned through 90°. A comparison of the cores as they appear in Figure 5 with the position they assume in Figure 9 will illustrate this turning feature. It will be appreciated that upon entering the chute 66 at its upper end 68 the cores are propelled by both gravity and the vibratory motion of the feed bowl 26 (the chute being attached to said bowl) to the lower end 70.

Upon reaching the lower end 70 of the chute 66, the foremost core 40 of the series is presented to an opening 72 of a vacuum tube or conduit 74, a source of vacuum being applied to the other end of this tube via a tube 76 leading to a vacuum pump (not shown) controlled by the panel switch 14. From Figure 9 it will be discerned that the outside diameter of the cores is too great to permit the foremost core to enter the tube 74 via this opening 72. In other words, only a peripheral segment will be received. Hence, by reason of the vacuum action applied at the opening 72 the further progress of the cores 40 is arrested, the foremost core being releasably retained at this station with the consequence that the entire volume of the feed chute 66 fills with other cores. Thus, it is the foremost core at this station that, until removed, blocks the passage of these other cores, thereby preventing them from being discharged from the chute 66.

A further feature of this particular manner of holding the foremost core in the chute 66 is that if any particular core 40 is appreciably undersize, or should it be a chip or broken section not previously removed by the several aforementioned screening actions, such a core or chip will enter the tube 74 through the opening 72 under the influence of the applied vacuum. Consequently, the next core above in the feed chute 66 will be automatically delivered to the station to take its place. Should this happen, the succeeding core will be held by the action of the vacuum, assuming it is not undersize.

Figures 9, 11:
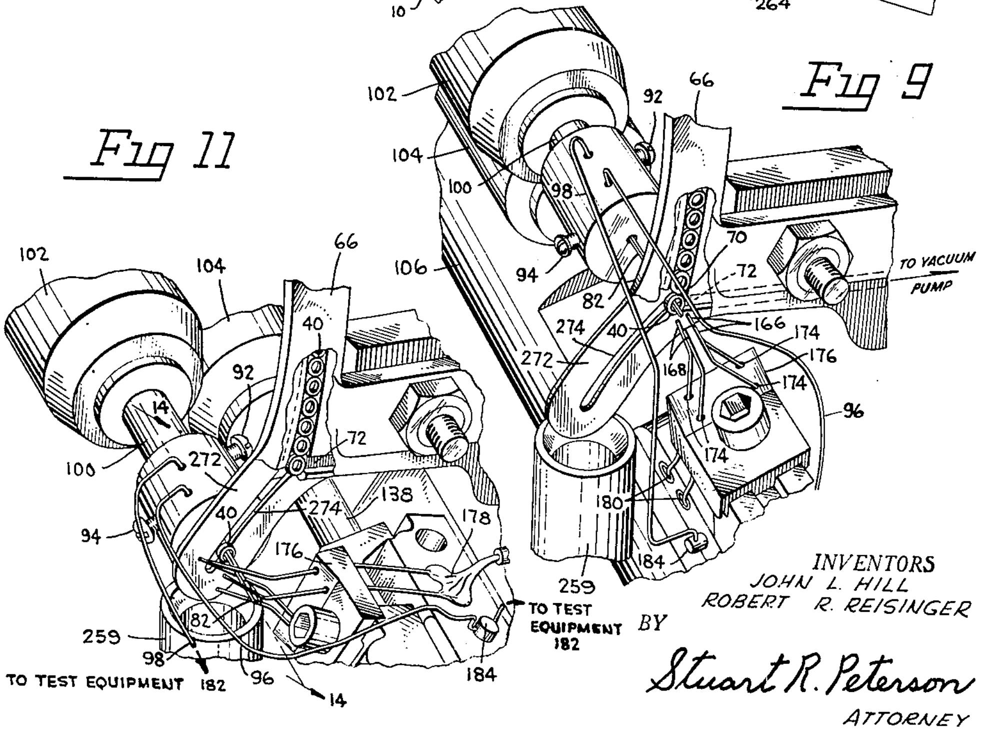
Figure 9 is a fragmentary perspective view showing the lower end of the feed chute and the location of the vacuum opening with respect thereto plus the probe in the early stage of being inserted into the opening of a vacuum-held core.
Figure 11 is a view corresponding to Figure 9 but showing the probe nearing the end of its lateral travel in a direction away from the vacuum opening, the electrical testing of the core having been completed during a portion of this lateral travel.

As can be seen from Figure 9, each core 40 that is presented to the vacuum holding station has the axis of its opening oriented in the same direction. More specifically, the various cores are delivered to the receiving or vacuum-holding station with their openings extending horizontally.

Figures 12, 13, 14:
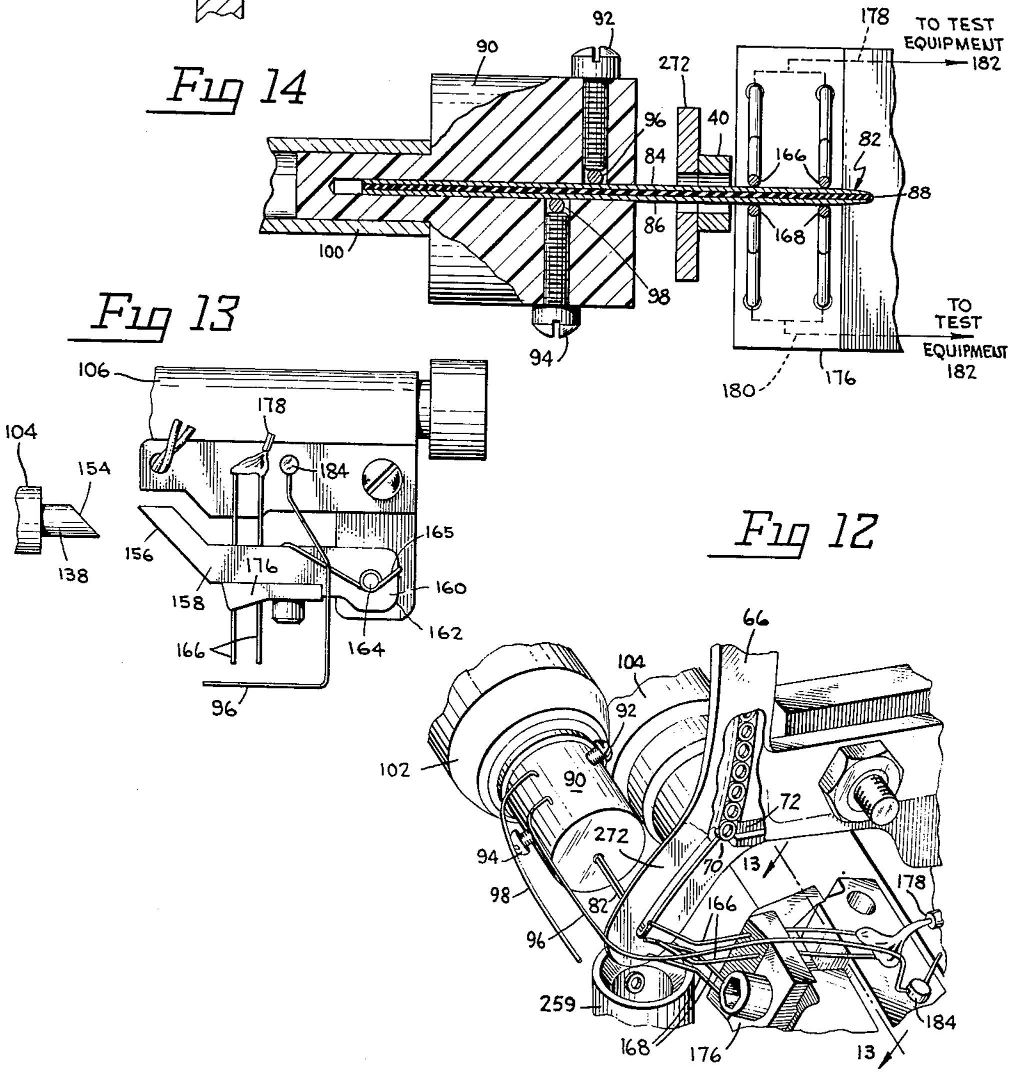
Figure 12 is a view also corresponding to Figure 9 but depicting the probe after having reached the end of its lateral travel and after full retraction thereof with respect to the stripping plate, the view showing the core previously carried by the probe in the process of falling into the upper end of a funnel leading to the solenoid actuated classifying tubes.
Figure 13 is a detail plan view taken in the direction of line 13—13 of Figure 12 illustrating the manner in which the contact wires are actuated into a probe engaging position.
Figure 14 is a sectional view taken in the direction of the line 14—14 of Figure 11.

Next to be described is the mechanism, denoted generally by the reference numeral 80, by which the successive cores 40 are removed or picked off from their vacuum-held position. Included in this mechanism 80 is a probe 82 constrained to follow both a reciprocal and curvilinear path. The specific construction of the elongated probe is not important to the practicing of the invention. However, from Figure 14, it can be seen that the exemplary probe 82, which is of needle-like configuration, constitutes a pair of metallic electrodes 84, 86 separated by a layer of electrical insulation 88, these elements projecting as a unit from a head 90 of plastic material, such as nylon. The head 90 is tapped for the threaded reception of a pair of screws 92, 94, one having its inner end pressing against a flexible conductor 96 to effect electrical engagement with the electrode 84 and the other forcing a second flexible conductor 98 into engagement with the other electrode 86. More will be said later on concerning the other ends of these conductors.

The head 90 is mounted on one end of a rod 100 disposed for reciprocal movement in a sleeve bearing 102. As best viewed in Figure 6, the sleeve 102 is tangentially attached to a second sleeve bearing 104, the purpose of which will be presently explained and which sleeve 104 in turn is tangentially attached to a third sleeve bearing 106. The third sleeve bearing 106 serves as a pivot for the bearings 102 and 104, since it encircles a fixed shaft 108 carried by a pair of upright standards 110 secured to the housing 10. Pivotal or rocking movement is imparted to the bearing 106 via a rocker arm 112, a connecting rod 114, and a turnbuckle (not shown) included as part of said connecting rod. In practice the turnbuckle permits the angular position of the outer bearing 102 to be adjusted so as to bring the probe 82 into axial alignment with the opening of each core 40 when releasably held at the vacuum station opening 72.

While the above-described rocking movement is designed to effect a lateral motion of the probe 82 through a curvilinear path, means are included in the mechanism 80 by which the rod 100 is periodically actuated through a reciprocal path. To achieve the desired reciprocation of the rod 100, and hence the probe 82, a reversing lever 116 is pivotally connected intermediate its ends by a pin 118 supported in a bearing block 120 fixedly located atop the housing 10. At the upper end of the lever 116 is an adjusting screw 122 extending completely through this lever end, as can be seen from Figure 8. On one end of the screw is a knurled knob 124 by which the screw may be advanced or retracted and the other end of the screw is formed with a hemispherical recess 125. Once properly adjusted, the adjustment of the screw 122 may be maintained by reason of a lock nut 126 which can be tightened against the end of the lever 116.

Figure 8:
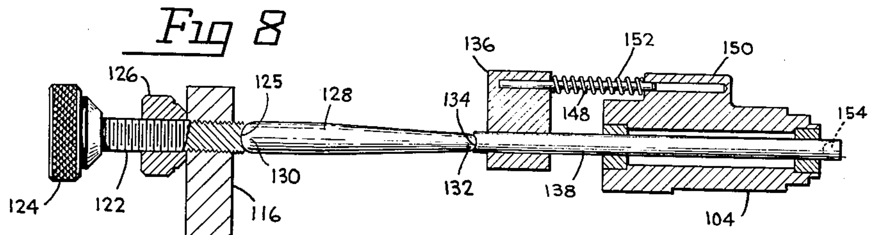
Figure 8 is a sectional detail view taken in the direction of line 8—8 of Figure 6.

Continuing with the specific means disclosed for producing the reciprocal movement of the rod 100, it is to be noted that a push rod 128 has a ball end 130 seated for swivel movement in the recess 126 at the end of the screw 122 and an opposite ball end 132 similarly seated in a hemispherical recess 134 formed in a yoke 136 (see Figure 8). The yoke 136 is fixedly attached to the projecting end of a rod 138 slidably disposed in the sleeve 104.

The particular role played by the rod 138 is better reserved for later discussion. At this time, though, it is to be noted that the yoke 136 is bifurcated to form a slot at 140 for the accommodation of a reduced diameter section 140 on the rod 100, the reduced diameter or undercut section 142 providing what amounts to spaced shoulders at each side of the yoke 136. Actually, the length of the section 142, that is, the spacing between the shoulders is somewhat greater than the width of the yoke 136 so as to supply a lost-motion action, the reason for which will soon become manifest.

The yoke 136 is biased in the direction of the reversing lever 116. To accomplish this biasing, an auxiliary rod 148 is fixedly carried by the yoke 136, the auxiliary rod extending parallel to the rod 138. The free end of this auxiliary rod 148 is slidably received in a tubular boss 150 affixed to the sleeve 104. Encircling the auxiliary rod 148 is a coil spring 152, its ends abutting said boss 150 and the yoke 136, thereby furnishing the above-alluded to biasing action.

Returning now to a further description of the rod 138 slidably supported by the sleeve 104, attention is directed to the end thereof opposite the yoke-carrying end. This opposite end is formed with a sloping cam surface 154 designed to engage a mating surface 156 on a follower arm 158. By virtue of a forked end 160 on the arm 158 said arm is pivotally connected to a projecting lug 162 on the sleeve 106, a pin 164 extending through both the lug 162 and the forked end 160 providing the pivotal connection. A wire spring element 165 acts in a direction to urge the arm 158 away from the sleeve 106, the biasing action of this spring readily being overcome by the cam surface 154 when advanced against the surface 156.

Figures 6, 7:
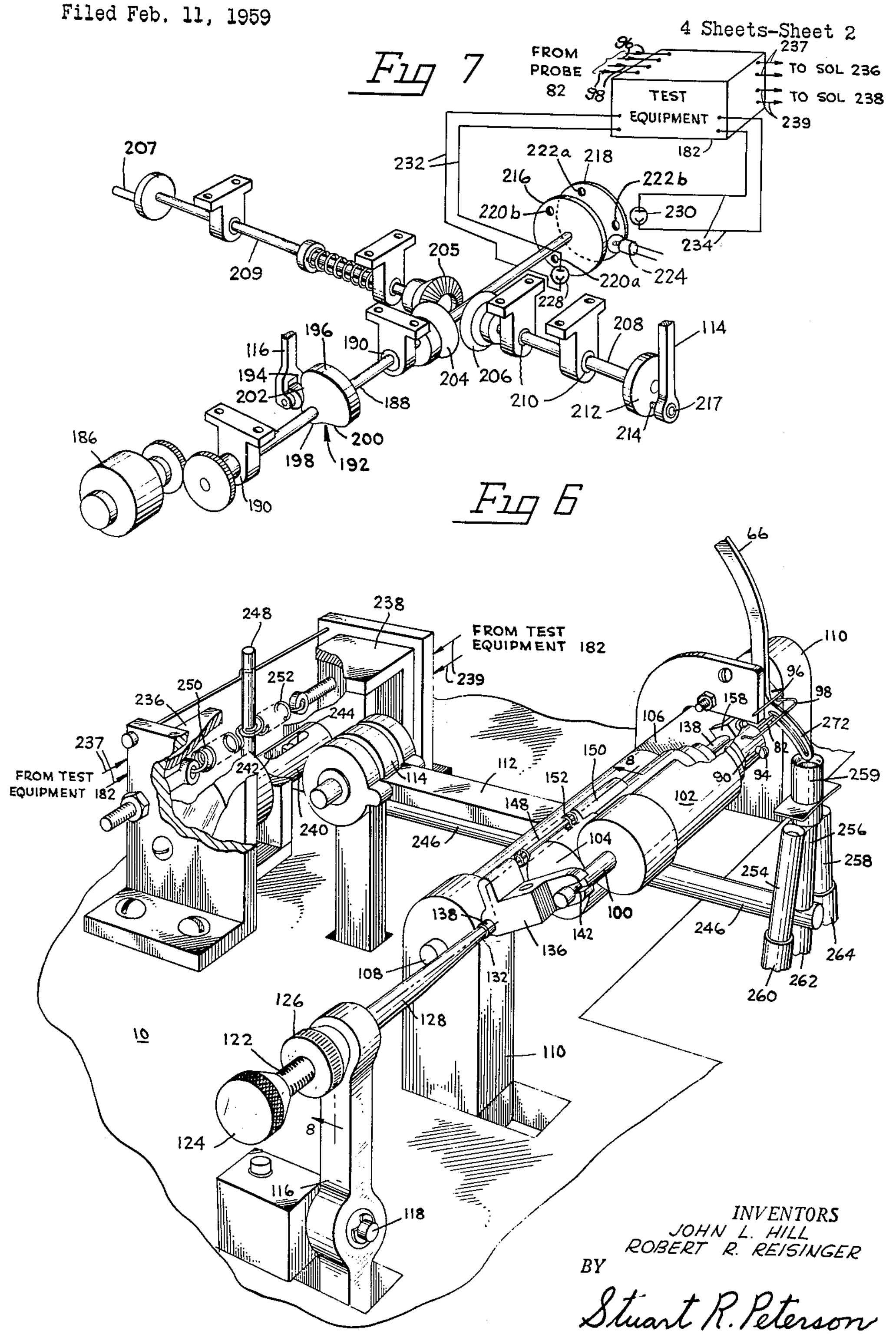
Figure 6 is a fragmentary perspective view taken from a vantage point above and to the left of Figure 1 with the probe fully retracted.
Figure 7 is a perspective sectional view taken at substantially the same angle as Figure 6, the section being along the line 7—7 of Figure 1 and generally in a plane containing the lower surface of the top of the housing.

Two pairs of contact wires 166 and 168 have their lower ends insulatingly anchored to the sleeve 106 so as to rock therewith. These wires 166, 168 have converging or inwardly sloping portions and generally parallel upper end portions, the inclined portions passing upwardly through four apertures 174 formed in an insulating block 176 fixedly carried by the follower arm 158. The inherent resiliency of the contact wires 166, 168 causes them to be biased apart, but this tendency is readily overcome when the follower arm 158 is cammed upwardly by the surface 154 on the rod 138, the wires 166, 168 then being forced toward each other owing to their inclined portions being forced inwardly by the block 176. It is this inward forcing or stressing of the wires that effects engagement of the wires 166 with the electrode 84 of the probe 82 and similar engagement of the wires 168 with the other electrode 86 of this probe. However, such engagement is effected only at certain times, as will subsequently be made apparent. The wires 166 are joined at their anchored ends to a conductor 178 and the wires 168 are joined to a second conductor 180, the two conductors 178, 180 leading to test equipment indicated generally by the reference numeral 182 (Figure 7). The previously mentioned conductors 96, 98 also lead to this test equipment to complete the circuit in the magnetic testing of the various cores 40. The test equipment 182, it will be appreciated, comprises a test current circuit for applying appropriate electrical pulses to each core 40 when encircling the probe 82 and a readout or decision circuit for determining what dispositon is to be made of each core. Inasmuch as it has now been stated that the probe 82 traverses a reciprocal path, the flexural fatigue of these conductors 96, 98 is minimized by having their nominally fixed ends carried in a nylon pin 184 which turns during the reciprocating movement of the probe 82, the pin 184 being supported on the sleeve 106 so as to pivot therewith.

Having presented a description of the mechanism 80, the actuating means for this mechanism will now be referred to. Accordingly, especial consideration should be given to Figure 7. This figure depicts a drive motor 186 contained within the housing 10 which motor is started by means of the switch 20. The motor 186 is mechanically coupled to a cam shaft 188 journaled in a pair of bearings 190 which are attached to the underside of the top of the housing 10. Mounted on the shaft 188 is a cam 192, the periphery of which is constantly in engagement with a follower 194 on the lower end of the reversing lever 116. The contour given to the cam 192 is of dual radii, there being two dwell portions 196, 198 of 150° each with two 30° transition portions 200, 202 sloping between said dwell portions. By means of a pair of bevel gears 204, 206 the rotation imparted to the shaft 188 is transmitted to a second shaft 208, the gear 204 being on the shaft 188 and the gear 206 on the shaft 208. If desired, a manually actuatable gear 205 may be provided which can be urged into engagement with the gear 204 and rotated by means of a hand operated crank 207 via an auxiliary shaft 209. In this way the operability of the system may be conveniently checked prior to applying power. The shaft 208 is journaled in a pair of bearings 210 so as to provide an overhanging shaft section on which is mounted a disc 212 having a crank pin 214. The crank pin 214 projects into the opening of a bearing 217 provided at the lower end of the connecting rod 114, thereby transmitting sinusoidal movement thereto. Thus the single drive motor 186 is instrumental in actuating both the connecting rod 114 and the reversing lever 116 in a predetermined timed or synchronized relationship, thereby causing the probe 82 to traverse both reciprocal and curvilinear paths.

As will be more fully understood from a typical operational sequence, the probe 82 is responsible for removing each core 40 from its vacuum-held position at the previously mentioned receiving station after said probe has been projected or inserted through the opening of such a core. It is the lateral or curvilinear motion that effects this dislodgment. Since it is planned that the core testing take place during a portion of this curvilinear travel, a pair of discs 216, 218 are mounted on the previously mentioned cam shaft 188. The disc 216 has a pair of apertures 220*a*, 220*b* therein, and the disc 218 contains a pair of apertures 222*a*, 222*b*. In each instance, the apertures are angularly spaced from each other by a predetermined angle, say 120°. Through the medium of a light source 224 located between the discs, arrival of the aperture 220*a* in the beam of light will cause the light rays to pass therethrough and impinge upon a photoelectric cell 228, and by the same token the aperture 222*a* of the disc 218 when rotated into position will cause light to be passed onto a second photoelectric cell 230. A pair of conductors 232 leading from the photocell 228 to the test equipment conducts a signal derived from the aperture 220*a* which signal triggers or energizes the test equipment into operation. A second pair of conductors 234 conducts a signal derived from the aperture 222*a* to the test equipment 182 for the forwarding of a sorting signal, as will below become clearer.

Reference has already herein been made to Patent 2,817,809 wherein certain tests are described. Upon completion of the testing period during the lateral or curvilinear travel of the probe 82 the test equipment 182, by way of the decision circuitry contained therein, determines the disposition that is to be made of each particular core 40. Cooperating in the proper disposition of the successive cores is a pair of sorting solenoids 236, 238 in circuit with the test equipment 182. A pair of conductors 237 connects the solenoid 236 to the test equipment 182, and a pair of conductors 239 similarly connects the solenoid 238 to the equipment 182. From Figure 6 it can be seen that the solenoids 236, 238 have a common armature 240 provided with a centrally located slot 242. A lug 244 carried on a rock shaft 246 projects into the slot 242 so that the shaft 246 will be rocked in one direction when the solenoid 236 is energized by a sorting signal transmitted over the conductors 237, and in an opposite direction when the other solenoid 238 is energized by a sorting signal forwarded over the conductors 239. When neither solenoid is energized, the shaft 246 is maintained in a neutral position by reason of a lever arm 248 and a pair of neutralizing springs 250, 252 connected thereto, the opposite ends of these springs being fixedly anchored to stationary portions of the solenoids 236, 238 or other fixed locations. Thus while the disc aperture 220*a* is employed to trigger on the test equipment, the aperture 220*b* triggers the equipment off. Also, the aperture 222*a* is responsible for conditioning the test equipment 182 in a time-wise manner so that sorting signals can only be forwarded to the solenoids 236, 238 during intervals synchronized with the testing intervals. The aperture 222*b*, on the other hand, is responsible for terminating the sorting intervals after the sorting has been completed for each tested core. In practice, the sorting interval will be inaugurated near the end of the test interval. Consequently, provision is made for determining which solenoid is to be energized and when such energization can occur.

The sorting solenoids 236, 238 are located adjacent the rear end of the rock shaft 246. As can be seen from Figures 1 and 7, especially the latter, the forward end of the rock shaft 246 has a trio of tubes 254, 256 and 258 joined together at their upper ends to form an assembled unit. Above these tubes 254, 256 and 258 is fixedly mounted a funnel 259 into which the successive cores 40 drop after they have been tested and removed from the probe 82. Flexible tubes or conduits 260, 262 and 264 attached to the lower ends of the tubes 254, 256 and 258 lead to three receptacles 266, 268 and 270, respectively (Figure 1). Therefore, depending upon which direction the shaft 246 is rocked, the cores 40 will be delivered to the appropriate receptacle 266, 268 and 270 and are in this way classified according to their magnetic characteristics.

The manner in which the cores 40 are removed from the probe 82 will now be described. In the accomplishment of this objective, a stripper plate 272 is attached to the lower end of the feed chute 66, this plate having an arcuate slot 274 of a length greater than the distance through which the probe 82 moves in traversing its curvilinear path. The slot 274 has a width less than the outside diameter of the cores 40 and the cores are thus stripped or wiped from the probe 82 when the probe is retracted relative to said plate. The above-mentioned funnel 259 is located beneath the lower end of the stripper plate 272 so as to guide properly the cores as they fall from the probe.

Having in mind the construction and arrangement of the principal elements thereof, it is believed that a complete understanding of the invention may now be had from a description of its operation. Accordingly, a number of toroidal cores 40 are placed in the feed box 36 on top of the grizzly 38. With the feed switch 16 turned on and the knob 18 adjusted to the desired rate of feed, the conveyor mechanism 22 will be set into vibration with the consequence that various cores 40 under a prescribed size will pass downwardly by gravity between the bars of the grizzly 38. Those cores too large to pass through the apertures 46 in the partition or screen 44 will exit via the opening 52 onto the floor 32 of the feed bowl 26. Any broken cores 48, however, will be separated out, since they will fall through the apertures 46 into the compartment 50.

From the floor 32 the cores 40 are vibrated up the track or raceway 30 to the upper end 68 of the feed chute 66, entering said chute in a single file manner. Due to both gravity and vibration the cores 40 proceed downwardly through the chute, and enroute are turned from a horizontal position, i.e. with a position in which their openings are vertical, to a vertical position in which their openings extend horizontally. The lower end 70 of the chute, together with the opening 72 of the vacuum tube 74, constitute the vacuum or receiving station where the foremost core is releasably held until picked off by the probe 82.

Figure 10:
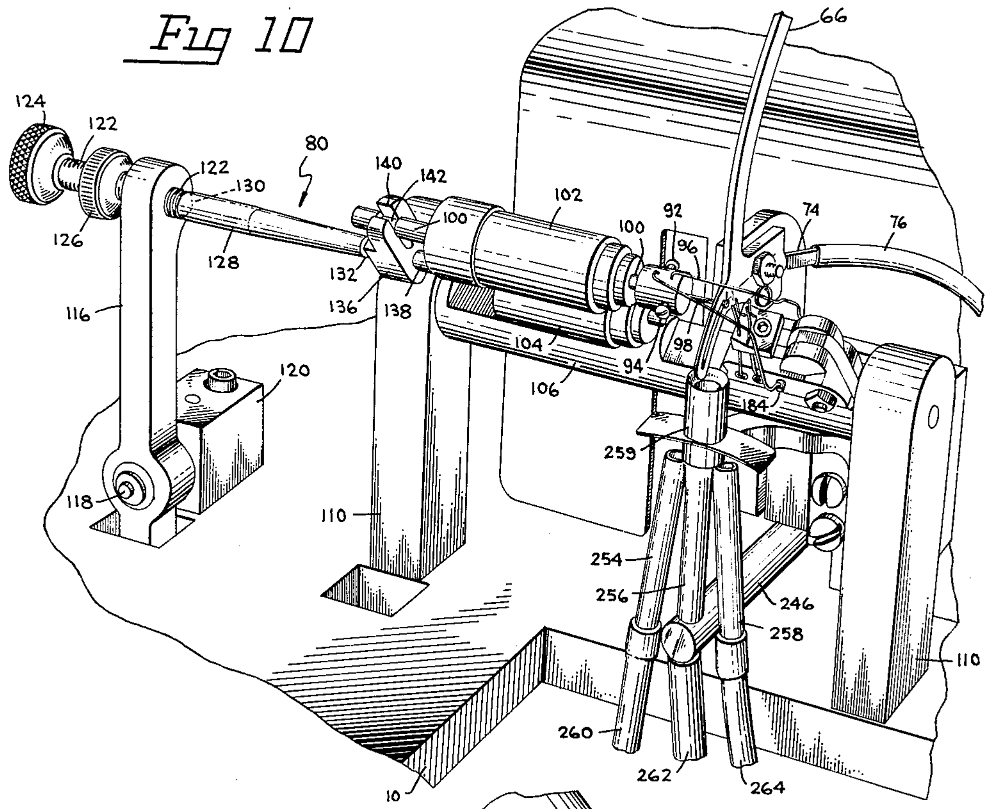
Figure 10 is a fragmentary perspective view of the probe actuating mechanism in the position it would assume to produce the degree of probe insertion pictured in Figure 9.

When the switch 20 is turned on, the probe 82, assuming that it is then fully retracted, is advanced through the first part of its reciprocal path to cause the probe to be inserted through the opening of the core held at the opening 72. The initial stage of probe advancement is best viewed in Figure 9, although close examination of Figure 10 will also show such a state of advancement. The cam 192 produces this insertion by acting against the follower 194 at the lower end of the reversing lever 116, since this causes the yoke 136 to bear against the shoulder at the right of the reduced section 142 of the rod 100 on which the probe is carried.

It might be explained that by means of the previously mentioned turnbuckle, which has not been illustrated, the length of the connecting rod 114 may be adjusted so that it is of a length to align initially the axis of the sleeve 102 with the center of a core opening at the vacuum or receiving station. Once properly determined the adjustment need not be changed until a different size core 40 is to be handled. In this respect, it will be understood that the connecting rod 114 has its upper end pivotally connected to the arm 112 and that this arm is integral with the sleeve 106. The sleeve 106 being pivotally mounted on the rod or shaft 108 is responsible for providing an axis about which the sleeves 102 and 104 are rotated or swung as a unit. More will be said presently about the ensuing curvilinear travel of the probe 82.

Owing to the fact that the yoke 136 is mounted directly on the rod 138 it, too, advances during this rectilinear movement. Sufficient advancement, occurring near the end of the advancing stroke, effects engagement of its cam end 154 with the surface 156 on the arm 158, whereupon the insulating block 176 is lifted to flex the contact wires 166, 168 inwardly against the electrodes 84, 86 of the probe 82. It will be appreciated that this occurs almost at the end of the rectilinear probe travel, thereby producing very little rubbing between the probe and contact wires. As soon will be emphasized, no rubbing occurs during retraction of the probe.

Inasmuch as the foregoing rectilinear advancement or insertion of the probe 82 is accomplished by the cam 192, more particularly the transitional portion 202 involving only a 30° segment thereof, it will be apparent that the movement of the connecting rod 114 can be synchronized with the cam rotation so as not to produce any rocking of the arm 112 until the dwell portion 196 has been reached, this being the larger radius section of the cam. After insertion of the probe 82 has been completed, though, the connecting rod 114 is responsible for actuating the arm so as to raise its free end, thereby pivoting both the sleeves 102, 104 about their common pivotal axis provided by the rod or shaft 108. This imparts a lateral movement, more specifically curvilinear, to the probe 82, causing it to depart from the vacuum station at which the foremost core 40 has been releasably held and of course carrying with it the foremost core.

During this curvilinear travel the cam 192 is presenting only its dwell portion 196 to the follower 194 on the reversing lever 114 with the result that no probe reciprocation occurs. By having the disc 216 angularly oriented on the cam shaft 188 so as to cause its aperture 222*a* to pass into the light beam from the source 224 after the curvilinear travel of the probe has been inaugurated, the test equipment is thereby placed in operation during the probe's curvilinear travel. Depending upon what the test results are, either one of the sorting solenoids 236 or 238 will be energized or neither will be. Thus, the shaft 246 will be rocked in a particular direction if one of the solenoids is energized, or it will remain in its neutral position if neither is energized, such action or inaction causing the appropriate guide tube 260, 262 or 264 to be positioned beneath the funnel 259 for subsequent reception of the core 40 now being carried by the probe 82. It is when the aperture segment 220*b* on the disc 216 meets the light beam that the test equipment 182 is deenergized, together with the solenoid 238 or 240 if the testing has caused energization of either solenoid.

Next in the series of events is what transpires upon the probe 82 reaching the position pictured in Figure 11. At this moment the probe is nearing the end of its curvilinear travel, which means that the connecting rod 114 is nearing the upper end of its stroke. This also means that the transitional portion 202 is about to arrive at the follower 194 on the lower end of the reversing lever 116.

Juxtapositioning of the portion 202 in alignment with the follower 194 frees the reversing lever for return to its original position. First to happen, however, is that the spring 148 urges the yoke 136 to the left as viewed in Figure 6. This causes an immediate retraction of the rod 138 and disengagement of its cam end 154 from the mating surface 156 on the end of the arm 158. Due to this release, the arm 158 pivots in a counter-clockwise direction, as viewed in Figure 13, to allow the wire contacts 166 and 168 to flex apart by virtue of their inherent resiliency, thereby breaking their previously established contact with the electrodes 84 and 86 of the probe 82.

Because of the lost-motion coupling provided by the reduced diameter section 142, the yoke 136 does not immediately engage the left shoulder of the rod 100. By the time that engagement is effected, however, the contact wires 166, 168 will have separated and the probe 82 then proceeds to retract without any undesired rubbing taking place. Thus, while only a small amount of rubbing between the probe 82 and the wires 166, 168 occurs during advancement, none at all takes place during the retraction portion of the probe's rectilinear travel.

Since the probe 82 is retracted through the slot 274 of the stripper plate 272, the core 40 that has undergone its testing sequence will be stripped or wiped from the probe by engagement of the core with said plate, the slot being only wide enough to permit passage of the probe. Such action results in the core 40 dropping into the funnel 259. The appropriate tube 260, 262 or 264 being subjacent the funnel 259, it will be seen that the core in question will now be gravitationally directed to the proper receptacle 266, 268 or 270, as the case may be.

After the cam 192 has permitted the probe 82 to retract, as outlined above, the aperture 220*b* in the disc 216 permits light to pass onto the photocell 230 to deenergize the test equipment 182 and the subsequent arrival of the aperture 222*b* into the light path completely disconnects the sorting solenoids 236, 238 from said test equipment.

Finally, the probe 82 is returned to its upper position while fully retracted. This is accomplished while the follower 194 rides against the dwell portion 198 of the cam 192, the connecting rod 114 then being pulled downwardly by the disc 212 to which it is connected. Figure 6 depicts the probe 82 in the fully returned position and in which position it is then ready to undergo a second cycle identical with the one described above. Of course, as soon as the core 40 that has just been classified was picked or removed from the vacuum or receiving station at the lower end 70 of the feed chute 66, the core next above moved into its place.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A magnetic core handling device comprising vacuum means for releasably holding a toroidal core with the axis of its opening extending in a given direction, an elongated probe, means for inserting said probe into the opening of said core, and means for moving said probe away from said vacuum means to effect a release of said core from said vacuum means.

2. A magnetic core handling device in accordance with claim 1 in which said last-mentioned means moves said probe through a predetermined distance, and means in circuit with said probe for subjecting said core to a desired characteristics test during at least a portion of the probe's travel through said predetermined distance.

3. A magnetic core handling device comprising vacuum means for releasably holding a toroidal core with the axis of its opening extending in a given direction, an elongated probe, means for advancing and retracting said probe relative to said vacuum means in a direction to cause said probe to be inserted in the opening of said core, means for moving said probe a predetermined distance away from said vacuum means to effect a release of said core from said vacuum means, means associated with said advancing and retracting means for initiating the retraction of the probe only after said probe has been moved said predetermined distance, and means engageable with the core during the retraction of the probe for causing removal of said core from said probe.

4. A magnetic core handling device in accordance with claim 3 including means for electromagnetically testing said core, movable contact means in circuit with said testing means, and means synchronized with said advancing and retracting means for causing engagement of said contact means with said probe after advancement of the probe into the core opening and disengagement therefrom before retraction of said probe.

5. A magnetic core handling device comprising means for successively delivering a series of toroidal cores to a station with the opening of each core extending in the same general direction upon arrival at said station, vacuum means forming an opening adjacent the station of sufficient dimensions to receive only a peripheral segment of each successive core and thereby releasably hold each core with its opening extending in said general direction while at said station, an elongated probe of a size to permit insertion in the various core openings, means for advancing said probe in said general direction to cause said probe to be inserted in the opening of a core held by said vacuum means, and means for moving said probe laterally relative to said general direction and away from the opening of said vacuum means while said probe is inserted to carry away the particular core then being held by said vacuum means.

6. A core handling device in accordance with claim 5 in which said delivery means includes a downwardly extending passage of rectangular cross section through which said cores pass, the lower end of said passage being substantially vertical and terminating at said station, and in which said vacuum means includes a generally horizontal passage providing said opening at one end thereof, whereby as the foremost core of said series is discharged from said vertical passage portion said core will be held at the opening of said vacuum passage until dislodged by the lateral movement of said probe.

7. A core handling device in accordance with claim 6 including means for retracting said probe upon completion of its lateral travel, and means for stripping the core from said probe during its retractive travel.

8. A core handling device in accordance with claim 7 including means cooperable with said probe for subjecting the core to a desired characteristics test during said lateral travel.

9. A core handling device in accordance with claim 8 in which said cooperable means includes a pair of electrical wire contacts movable in unison with said means for moving said probe laterally.

10. A core handling device in accordance with claim 9 including means synchronized with said probe advancing means for causing engagement of said contacts with said probe prior to the beginning of said lateral travel.

11. A core handling device in accordance with claim 10 including means for effecting disengagement of said contacts from said probe before its retraction.

12. A core handling device comprising means for conveying a plurality of randomly received toroidal cores into a horizontal position with their openings extending vertically, a downwardly curving feed chute provided with a generally rectangular passage therethrough having a width and height of a size for the slidable accommodation of said cores, said chute having a horizontal upper end portion connected to said conveying means so as to accept the horizontally arranged cores from said conveying means and having a vertical lower end portion for discharging said cores to a delivery station, said chute having a 90° twist intermediate its ends so as to present the cores to said station with their openings directed horizontally, a vacuum tube having a generally horizontal end portion residing in a plane substantially parallel to the lower end portion of said chute and providing a vertically disposed opening dimensioned so as to receive only a peripheral segment of each successive core and thereby releasably hold the foremost core with its opening extending horizontally while at said station, means for applying a vacuum to the opposite end portion of said vacuum tube, an elongated probe of a size to permit its insertion into the various core openings, a first horizontal sleeve, a first rod reciprocally disposed in said sleeve with its opposite ends projecting therefrom, one of said projecting ends carrying said probe, a second horizontal sleeve, a second rod reciprocally disposed in said second sleeve with its opposite ends projecting therefrom, the end of said second rod nearer said probe being inclined to provide a cam surface, support means mounting said sleeves for curvilinear movement about a common axis including a rocker arm projecting therefrom, a yoke mounted on the other end of said second rod provided with a slotted portion straddling said first rod, said first rod having a pair of shoulders spaced apart so as to provide a predetermined amount of clearance with said slotted yoke portion, a reversing lever, a push rod bearing against said lever and said yoke so as to urge said yoke in a direction to advance said probe into the opening of a core held at said station, a plurality of wire contacts anchored to said support means so as to be movable in unison with said sleeves about said common axis, means engageable by the cam surface on said second rod for causing engagement of said contacts with said probe, said last-mentioned means being located so as to be engaged by said cam surface after insertion of said probe through a core opening and during the last portion of probe advancement, means biasing said yoke and second rod in a direction away from said last-mentioned means whereby said second rod will be retracted prior to retraction of said first rod and the probe carried thereon owing to said shoulder spacing, a stripper plate fixedly located so as to strip each core from the probe during retraction of said probe, and means driving said reversing lever and rocker arm in a synchronized manner so that said reversing lever will be actuated in a direction to advance said first rod and said probe to effect insertion of said probe before said rocker arm is actuated and to effect a reverse movement of said reversing lever only after actuation of said rocker arm in a direction to move said probe away from said vacuum opening.

13. A magnetic core handling device in accordance with claim 12 including means for electromagnetically testing said cores, and means synchronized with said driving means for energizing said testing means during a prescribed portion of the actuation of said rocker arm.

14. A magnetic core handling device in accordance with claim 13 including sorting means disposed beneath said stripper plate actuatable into a selective position by said testing means.

References Cited in the file of this patent

UNITED STATES PATENTS

| | | |
|---|---|---|
| 2,679,025 | Rajchman et al. | May 18, 1954 |
| 2,711,509 | Endres et al. | June 21, 1955 |
| 2,760,153 | Rajchman et al. | Aug. 21, 1956 |
| 2,781,947 | Webster | Feb. 19, 1957 |
| 2,796,986 | Rajchman et al. | June 25, 1957 |
| 2,817,809 | Stuart-Williams | Dec. 24, 1957 |
| 2,858,018 | Alexander et al. | Oct. 28, 1958 |
| 2,889,962 | Foster | June 9, 1959 |
| 2,922,518 | Kristensen | Jan. 26, 1960 |

OTHER REFERENCES

"I.B.M.," Technical Disclosure Bulletin, vol. 1, No. 2, August 1958.